May 28, 1968 J. D. CZARNECKI 3,385,249
METHOD OF MAKING CONTAINERS
Filed Oct. 13, 1965 2 Sheets-Sheet 1
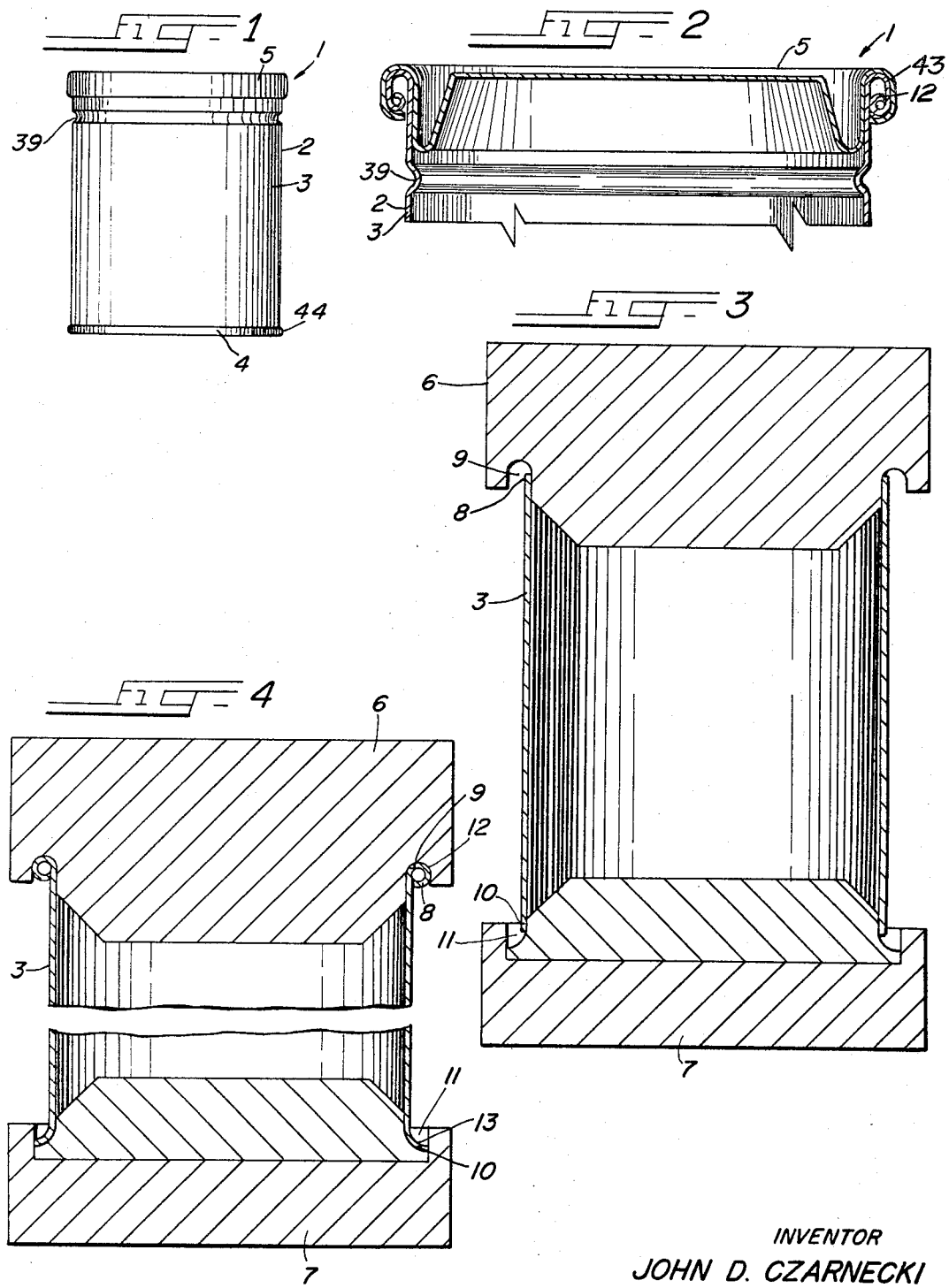
INVENTOR
JOHN D. CZARNECKI
BY
Marzall, Johnston Cook & Root
ATTYS.

May 28, 1968   J. D. CZARNECKI   3,385,249
METHOD OF MAKING CONTAINERS
Filed Oct. 13, 1965   2 Sheets-Sheet 2
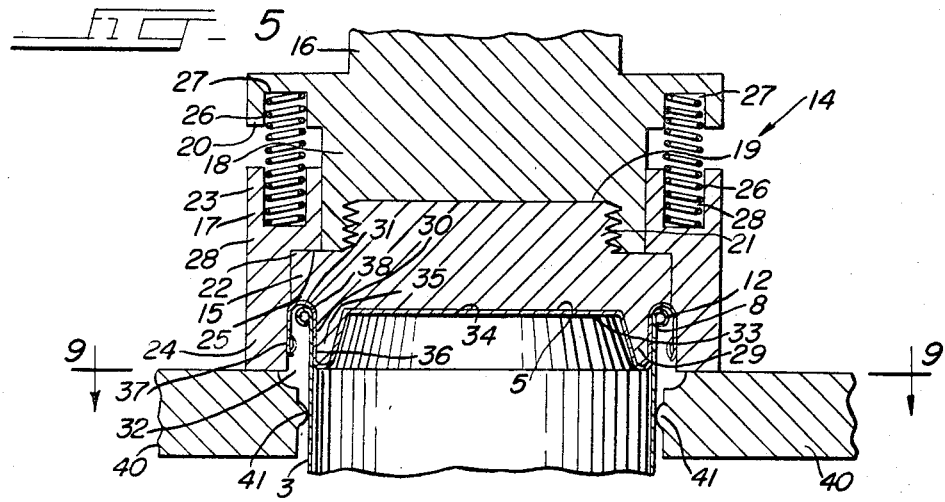
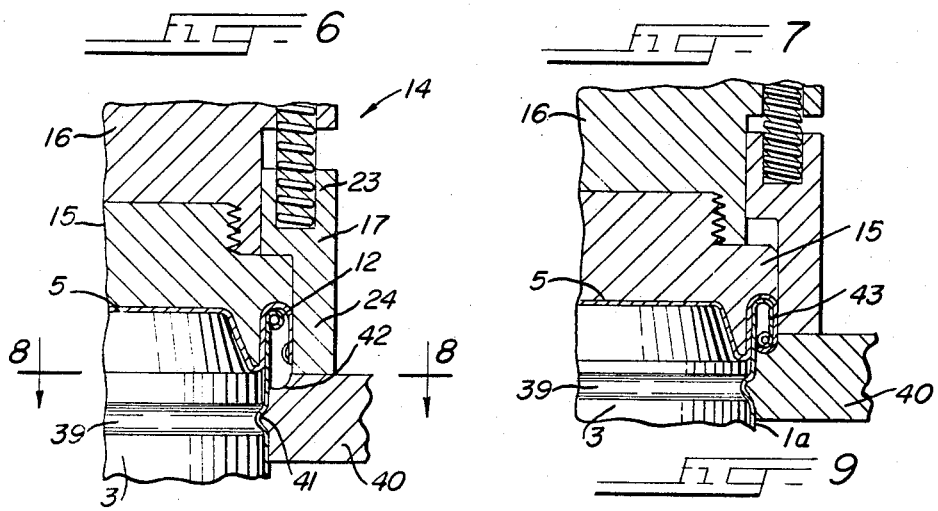
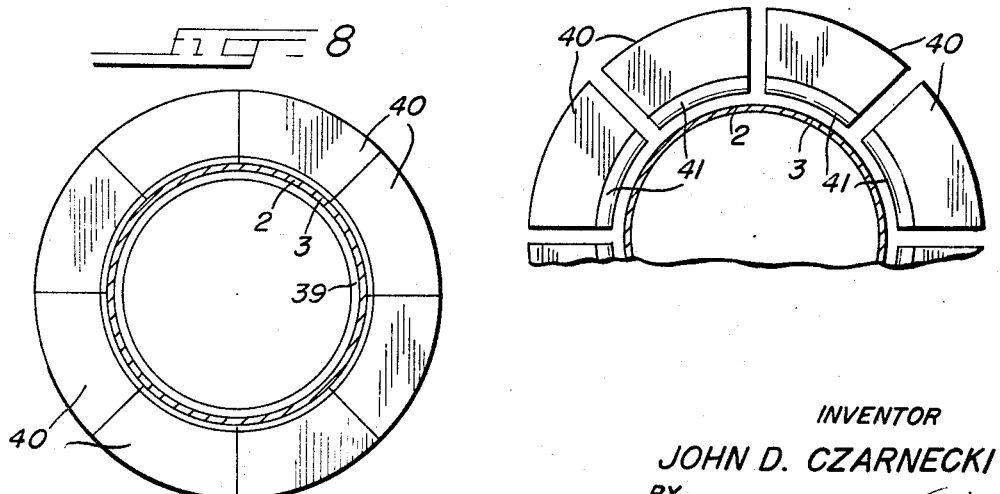
INVENTOR
JOHN D. CZARNECKI

United States Patent Office 3,385,249
Patented May 28, 1968

3,385,249
METHOD OF MAKING CONTAINERS
John D. Czarnecki, Downers Grove, Ill., assignor to The Sherwin-Williams Company, Cleveland, Ohio, a corporation of Ohio
Filed Oct. 13, 1965, Ser. No. 495,463
9 Claims. (Cl. 113—120)

ABSTRACT OF THE DISCLOSURE

A method of making a container wherein a curl is formed on the body portion of the container simultaneously with the bending of a flange on a closure member into closure-member-securing relation to said curl.

---

This invention relates to methods of making containers, and, more particularly, to methods of making containers embodying closure members which are effectively sealed to the body portions of the containers.

It is a primary object of the present invention to afford a novel method of making containers.

An object ancillary to the foregoing is to afford a novel method of the aforementioned type which is particularly well adapted for use in the manufacture of cans, and the like.

A further object is to enable a container embodying a curl on one end of the body portion thereof, with a closure member mounted on that end of the body portion in sealed relation to the aforementioned curl, to be manufactured in a novel and expeditious manner.

Containers having curls on the end edges thereof and with closure members mounted on such curls have been heretofore known in the art. However, the methods heretofore known in the art by which such containers have been made have commonly had several inherent disadvantages such as, for example, not effectively sealing such closures to the ends of the body portions of such containers; requiring a relatively large number of separate, time consuming operations; or requiring that the body portion of the container be completely constructed in one operation, and then the closure member mounted thereon in a completely separate operation, and the like. It is an important object of the present invention to enable such disadvantages to be overcome.

Another object of the present invention is to afford a novel method of forming and closing a container.

Yet another object is to afford a novel method of forming a container wherein the forming of the body portion or side wall portion of a container and the securing of a closure member thereon may be carried out in a novel and expeditious manner.

An object ancillary to the foregoing is to enable such body portion-forming and closure-securing operations to be carried out simultaneously in a novel and expeditious manner.

A further object of the present invention is to afford a novel method of forming a curl on the body portion of a container and securing a closure member on the curl.

Another object is to afford a novel method of forming a box curl and securing a closure member thereon.

Yet another object of the present invention is to afford a novel method of forming a container which is practical and efficient, and which is well-adapted for use in the commercial manufacture of containers such as cans, and the like.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles.

Other embodiments of the invention embodying the same or equivalent principles may be used and structural changes may be made as desired by those skilled in the art without departing from the present invention and the purview of the appended claims.

In the drawings:

FIG. 1 is a side elevational view of a container which may be made by the novel method of manufacture forming the subject matter hereof;

FIG. 2 is a fragmentary, longitudinal sectional view through the upper portion of the container shown in FIG. 1;

FIG. 3 is a longitudinal, sectional view through the side wall portion of a container, showing the side wall portion disposed in apparatus for forming the same, and illustrating an early step in the aforementioned method of manufacturing such a container;

FIG. 4 is a fragmentary, sectional view similar to FIG. 3, but showing a later step in the method of manufacture;

FIG. 5 is a fragmentary, sectional view of the upper portion of a container mounted in forming apparatus and illustrating a later step in the aforementioned method of manufacture;

FIG. 6 is a fragmentary, sectional view of the apparatus and container portion shown in FIG. 5, and illustrating a later step in the aforementioned method of manufacture;

FIG. 7 is a fragmentary, sectional view through the apparatus and end portion of the container shown in FIG. 6, and illustrating a later step in the aforementioned method of manufacture;

FIG. 8 is a detail, sectional view taken substantially along the line 8—8 in FIG. 6; and FIG. 9 is a fragmentary, detail, sectional view similar to FIG. 8 but showing the apparatus in the position illustrated in FIG. 5.

A container 1, which embodies the preferred type of container construction that may be afforded by the present invention, is shown in FIGS. 1 and 2 to illustrate the preferred form of end products afforded by the present invention; and in FIGS. 3–9 of the drawings the novel method of manufacture, which constitutes the present invention, is illustrated.

The container 1, which is shown in FIGS. 1 and 2 of the drawings, embodies a body portion 2 which includes a substantially cylindrical shaped, tubular side wall 3, having one end closed by a suitable end wall or bottom wall 4, and having the other end closed by a suitable cover member or closure member 5. The method of manufacture, which forms the subject matter of the present invention, is particularly well-adapted for manufacturing cans from suitable sheet metal, such as, for example, tin plate, aluminum, and the like, and in the construction of the container 1, it is presently preferred that the side wall 3, the bottom wall 4 and the closure member 5 be made of a suitable sheet metal such as, for example, the aforementioned tin plate. However, as will be appreciated by those skilled in the art, the side wall 3, the bottom wall 4 and the closure member 5 may be made of other suitable materials such as, for example, suitable plastic sheet materials, and the like, without departing from the purview of the present invention.

In the manufacture of the container 1 in accordance with the principles of the present invention, the side wall portion 3 is first formed as a straight-walled cylindrical-shaped, tubular member, as shown in FIG. 3. In this form the side wall 3 may be mounted in operative position between an upper die 6 and a lower die 7, with the upper edge 8 of the side wall 3 disposed in a recess 9 in the upper die 6, and with the lower edge 10 of the side wall 3 disposed in a recess 11 in the lower die 7. The dies 6 and 7 may then be moved together by a suitable apparatus, not shown, such as, for example, the driving mechanism of a suitable press, of which they may form a part, to thereby cause the upper edge 8 and the lower edge 10 of the side wall 2 to be formed into a radially, outwardly projecting curl 12, and a radially, outwardly projecting flange 13, respectively, as shown in FIG. 4. The recess 9 in the die 6 is preferably of such transverse cross-sectional shape that it is effective to form a 360° curl 12, as shown in FIG. 4; and the recess 11 in the die 7 is preferably of such shape that the lower end 10 of the side wall 3 curves outwardly from he intermediate body portion of the side wall 3 and terminates at its outer end in an outwardly facing direction which is substantially perpendicular to the longitudinal axis of the side wall 3.

After the formation of the curl 12 on the upper end 8 of the side wall 3, the upper end portion of the side wall 3 may be mounted in a suitable die mechanism, such as the die mechanism 14, FIG. 5, which includes a chuck 15 mounted on a chuck shank 16, with an annular retainer member or collar 17 disposed around the chuck 15. Preferably, when the upper end portion of the side wall 3 is disposed in the die mechanism 14, the lower end portion of the side wall 3 remains in the die 7, or is disposed in another die having the same configuration as the die 7. The die mechanism 14 may be embodied in the same press, or the like, as that in which the forming operation illustrated in FIGS. 3 and 4 was performed, in which event the upper end portion of the side wall 3 may be transferred from the die 6 to the die mechanism 14 without removing the side wall 3 from the press; or the die mechanism 14 may be disposed in a press different from that embodying the die 6, and, in that event, the side wall 3 will be removed from the die 7 and transferred to another die with the same configuration in the new press.

As shown in FIG. 5, the chuck shank 16 embodies an axially downwardly extending boss 18 having a downwardly opening recess 19 in the lower face thereof. The boss 18 is spaced from the outer peripheral edge of the shank 16 by a downwardly facing annular shoulder 20, and the chuck 15 has an upwardly projecting boss 21 which is mounted in the recess 19 of the chuck shank 16, and is threadedly or otherwise suitably secured thereto. The chuck 15 has an upwardly facing annular shoulder 22 extending around the boss 21, and when the chuck 15 is disposed in operative position in the chuck shank 16, the shoulder 22 is disposed in engagement with the outer periphery of the outer edge portion of the lower face of the boss 18 on the chuck shank 16, as shown in FIG. 5.

The collar 17 of the die mechanism 14 includes a substantial cylindrical shaped upper side wall portion 23 and a substantially cylindrical shaped lower side wall portion 24 of the same outside diameter, with the lower side wall portion 24 being of substantially narrower wall thickness than the upper side wall portion 23, to thereby afford a downwardly facing shoulder 25 on the inner face of the collar 17. When the die mechanism 14 is in fully assembled position, with the chuck 15 disposed in operative position on the chuck shank 16, the upper side wall portion 23 of the collar 17 is disposed on the boss 18 of the chuck shank 16 with a relatively snug but freely slidable fit, and the lower side wall portion 24 of the collar 17 is mounted on the main body portion of the chuck 15 below the boss 21, with a relatively snug, freely slidable fit. When the collar 17 is disposed in lowermost position on the chuck 15 and the chuck shank 16, the shoulder 25 thereof is disposed in abutting engagement with the shoulder 22 on the chuck 15, FIG. 5. Compression coil springs 26 are mounted in axially aligned recesses 27 and 28 in the chuck shank 16 and the collar 17, respectively, in position to yieldingly urge the collar 17, at all times, toward its aforementioned lowermost position.

The lower end of the chuck 15 embodies a downwardly projecting annular rib 29 having a substantially cylindrical shaped outer side wall portion 30 terminating at its upper end in a substantially radially-outwardly projecting, concave-downwardly flange 31. In the assembled die mechanism 14, the collar 17 is so disposed on the chuck 15 that the inner face of the lower end portion 24 of the collar 17 is disposed radially outwardly of the side wall portion 30 of the chuck 15 in such position that the inner face of the lower end portion 24 of the collar 17, the outer face 30 of the rib 29 of the chuck 15 and the flange 31 thereon define a downwardly-opening annular recess or die cavity 32. The rib 29 also defines the outer extremity of a recess 33 centered in the lower face of the lower end of the chuck 15. With such configuration of the lower end of the chuck 15, the die mechanism 14 is capable of receiving the closure member 5 therein, as well as the upper end of the side wall 3, as will be discussed in greater detail presently.

At the point in the method of manufacture of the container 1 illustrated in FIG. 5, the closure member 5 embodies a substantially disk-shaped central body portion 34 having an upwardly opening annular recess 35 disposed therearound. The outer periphery of the annular recess 35 is defined by an annular side wall portion 36 which projects downwardly below the central body portion 34, and which is connected to the outer peripheral edge portion 37 of the closure member 5 by a concave-downwardly wall portion 38. The side wall 36 and the outer peripheral portion 37 of the closure member 5 form flanges which are disposed in substantially parallel spaced relation to each other and define the opposite sides of a downwardly-opening recess in the cover 5, and when the cover 5 is disposed in operative position in the die mechanism 14, they are disposed in abutting juxtaposition to the inner and outer side walls of the recess 32 therein, with the wall portion 38 disposed in abutting juxtaposition to the flange 31.

In the method of manufacturing the container 1 in accordance with the principles of the present invention, the closure member 5 is disposed in the aforementioned operative position in the die mechanism 14 as shown in FIG. 5, and the upper end portion of the side wall 3 is then disposed in the recess 32 of the die mechanism 14 in snug-fitting juxtaposition to the outer surface of the side wall portion 36 of the closure member 5, and with the curl 12 disposed in abutting engagement with the lower face of the flange 38.

The container 1 shown in the drawings embodies an inwardly projecting bead 39 formed in the side wall 3 in downwardly spaced relation to the closure member 5. If the container being manufactured in accordance with the principles of the present invention is to embody such a bead, the bead 39 is preferably formed in the side wall 3 at this point in the operation, namely, after the side wall has been disposed in the die mechanism 14 with the curl 12 disposed in abutting engagement with the wall portion 38 of the closure member 5, as shown in FIG. 5. The bead 39 may be formed in any suitable manner, but, is preferably formed by segmented squeeze jaws 40 mounted below the collar 17 of the die mechanism 14.

The squeeze jaws 40 are disposed in a radial pattern, and each embodies an inwardly projecting rib 41 on the inner face thereof. The jaws 40 are so disposed with respect to the die mechanism 14 that when the side wall 3 is inserted into the die mechanism 14, it is inserted upwardly between the jaws 40, the jaws 40 at this time being disposed in retracted position to afford clearance for passage for the side wall 3 therebetween. After the side wall 3 has been disposed in the aforementioned operative position in the die mechanism 14 with the curl 12 disposed at the upper end of the recess 32, the squeeze jaws 40 may be moved inwardly towards each other by apparatus, not shown, to thereby form the bead 39 in the side wall 2. The squeeze jaws 40 may then be held in such actuated position in which position they afford a bottom wall for the recess 32, FIG. 6. The aforementioned bottom wall for the recess 32 is afforded by the upper inner shoulder portions 42 of the squeeze jaws 40, the shoulder portions 42 being concave upwardly and so disposed that when the squeeze jaws 40 are disposed in actuated position, the shoulder portions 42 afford an inwardly curved extension for the lower end of the inner side wall face of the lower portion 24 of the collar 17, which extension terminates in engagement with the outer face of the side wall 3 disposed in the die mechanism 14, in substantially perpendicular relation thereto, FIG. 6.

Thereafter, the die mechanism 14 may be moved downwardly toward the lower support for the side wall 3, the squeeze jaws 40 remaining stationary. The squeeze jaws 40 are at all times supportingly engaged with the lower end of the collar 17 of the die mechanism 14, and, therefore, the downward movement of the die mechanism 14 is effective to move the chuck 15 and the chuck shank 16 downwardly in the collar 17 against the urging of the springs 26.

The downward movement of the die mechanism 14 is effective to cause the curl 12 on the upper end of the side wall 3 to first slide outwardly along the wall portion 38 of the closure member 5 disposed in the die mechanism 14, and then downwardly along the inner face of the outer peripheral edge portion 37 thereof, to thereby form a box curl 43, having the curl 12 embodied therein in downwardly spaced relation to the top thereof, FIG. 7. During the initial downward movement of the die mechanism 14, the outer peripheral edge portion 37 of the cover 5 slides downwardly along the inner face of the collar 17 toward the shoulders 42 on the squeeze jaws 40. Toward the end of this downward movement of the die mechanism 14, the lower edge of the outer peripheral edge portion 37 of the closure member 5 engages the shoulder portions 42 of the squeeze jaws 40 while the curl 12 of the side wall 3 is still disposed in upwardly spaced relation thereto. Thereafter, the continued downward movement of the chuck 15 and the chuck shank 16 relative to the squeeze jaws 40 is effective to cause the free edge portion of the peripheral edge portion 37 of the closure 5 to slide inwardly along the shoulder portion 42 of the squeeze jaws 40 into underlying relation to the box curl 43, which is being simultaneously formed on the side wall 3. The shoulder 42 on the squeeze jaws 40 are preferably so disposed relative to the chuck 15 and the chuck shank 16 that at the completion of the box curl 43, and as the free edge of the peripheral edge portion 37 of the closure 5 engages the outer periphery of the container side wall 3, the free edge portion of the peripheral edge portion 37 of the closure 5 is disposed in firm clamping engagement with the lower face of the curl 12 on the side wall 3, and which forms the bottom of the box curl 43.

Preferably, prior to the aforementioned mounting of the closure member 5 in the die mechanism 14, the inner face of the free edge portion of the peripheral edge portion 37 of the closure member 5 is coated with a suitable sealing compound so that when it is subsequently moved into firm clamping engagement with the curl 12, an effective air-tight and liquid-tight seal is afforded therebetween. Preferably, the sealing compound 13 is a somewhat tacky, rubber-like material and may be any one of several suitable sealing materials readily available on the market such as, for example, a plastisol gasket sealing compound.

At the completion of this operation, the squeeze jaws 40 may again be moved into fully retracted position, and the side wall 3 with the closure member 5 mounted thereon may be removed from the die mechanism 14 by moving them downwardly through the squeeze jaws 40.

It will be seen that at this stage in the method of manufacture of the container 1, a container 1a, FIG. 7, has been afforded which is identical to the container 1, except that the end wall 14 is not disposed thereon. With this construction, the container 1a may be filled with the desired product, such as, for example, paint, oil, dry granular material, or the like, and the end wall 4 may subsequently be secured to the side wall 3 by suitable means such as, for example, forming a double rolled seam 44, FIG. 1, in the usual manner.

On the other hand, if it is desired to mount the end wall 4 on the side wall 3 prior to mounting the closure member or cover member 5 on the side wall 3, such mounting of the end wall 4 on the side wall 3 may be performed after the flange 13 has been formed on the side wall 3, as shown in FIG. 2, and prior to the insertion of the side wall 3 in the die mechanism 14. With this method of construction, an open-topped container is afforded by the body portion 2, which includes the side wall 3 and the end wall or bottom wall 4, and this container may be filled with the desired materials prior to insertion of the side wall 3 into the die mechanism 14. If this procedure is followed, the lower end portion of the side wall 3, with the bottom wall 4 secured thereto, of course, would not be inserted into a die, such as the die 7, at the time that the upper end portion of the side wall 3 is disposed in the die mechanism 14, but it would be supported in some other manner, such as, for example, in a suitable die, or on the lower platen, not shown, in the press in which the die mechanism 14 is mounted.

From the foregoing it will be seen that the present invention affords a novel method for manufacturing a container.

Also, it will be seen that the present invention affords a novel method of securing a closure member to a container.

In addition, it will be seen that the present invention affords a novel method of forming an end portion of the side wall of a container.

Also, it will be seen that the present invention affords a novel and practical method of manufacturing a container, which method may be economically and effectively used commercially.

Thus, while I have illustrated and described the preferred embodiment of my invention, it is to be understood it is capable of variation and modification, and I therefore do not wish to be limited to the precise details set forth, but desire to avail myself of such changes and alterations as fall within the purview of the following claims.

I claim:

1. The method of manufacturing a container comprising
  (a) forming a substantially cylindrical-shaped tubular side wall having two oppositely disposed ends,
  (b) forming a closure member for one end having an annular recess laterally defined by an inner flange and an outer flange,
  (c) placing one of said ends in said recess, and
  (d) then simultaneously deforming said end and said outer flange to thereby
    (1) form a curl on said end disposed within said recess and
    (2) move an edge portion of said outer flange toward said inner flange into restraining relation to said curl.

2. The method of manufacturing a container comprising
  (a) forming a substantially cylindrical-shaped tubular side wall having two oppositely disposed ends,
  (b) forming a closure member for one end having an annular recess laterally defined by an inner flange and an outer flange,
  (c) placing one of said ends in said recess,
  (d) forming a curl on said one end within the confines of said recess, and
  (e) moving an edge portion of said outer flange around said curl toward said inner flange into restraining relation to said curl.

3. The method of manufacturing a container comprising
   (a) forming a substantially cylindrical-shaped tubular side wall having two oppositely disposed ends,
   (b) forming a closure member for one end having an annular recess laterally defined by an inner flange and an outer flange,
   (c) placing one of said ends in said recess,
   (d) forming a curl on said end within the confines of said recess, with said curl having one side disposed in engagement with the junction of said flange, and with said curl having another side, remote from said one side and facing away from said junction, and
   (e) moving an edge portion of said outer flange around said other side of said curl toward said inner flange into clamping engagement with said other side.

4. The method of manufacturing a container comprising
   (a) placing an end of a tubular side wall member in an annular recess in a face of a substantially disk-shaped closure member,
   (b) forming a curl on said end within said recess by applying compression between said side wall member and said closure member in a direction substantially axial of said side wall member, and
   (c) bending the outer edge portion of said closure member around said curl into position to secure said closure member on said end.

5. The method of manufacturing a container comprising
   (a) forming a substantially cylindrical-shaped tubular side wall member with on outwardly projecting curl on one end thereof,
   (b) placing said curl and said end in an annular recess in one face of a substantially disk-shaped closure member,
   (c) forming another outwardly projecting curl on said end by applying compression between said side wall member and said closure member substantially axially of said side wall member, with said first mentioned curl forming one side of said other curl and disposed in spaced relation to the side of said other curl remote from said one side, and
   (d) bending the outer edge portion of said closure member around the side of said first mentioned curl remote from said second mentioned side of said other curl into position to secure said closure member on said one end.

6. The method of manufacturing a container comprising
   (a) placing a substantially disk-shaped closure member, having an annular recess in one face thereof and a corresponding annular ridge in the opposite face thereof, in a die member with said ridge disposed in a complementary recess in said die member,
   (b) placing a substantially cylindrical-shaped tubular side wall member in position wherein one end thereof is disposed in said annular recess,
   (c) pressing said side wall member against said closure member in a direction substantially axial of said side wall member and thereby forming a curl on said end within said annular recess, and
   (d) bending the outer edge portion of said closure member into said complementary recess into position to extend around a portion of said curl in such relation thereto as to secure said closure member against removal from said side wall member.

7. The method of manufacturing a container comprising
   (a) placing a substantially disk-shaped closure member having an annular recess in one face thereof and a substantially axially-aligned annular ridge in the opposite face thereof in a die member with said ridge disposed on a complementary recess in said die member,
   (b) placing a substantially cylindrical-shaped tubular side wall member in position wherein one end thereof is disposed in said annular recess,
   (c) disposing other die members adjacent said complementary recess in position to form a continuation of the outer side of said complementary recess,
   (d) moving said first mentioned die member and said side wall member toward each other in a direction substantially axial of said side wall member to thereby form an outwardly projecting curl on said one end within said annular recess, and
   (e) during the latter stages of forming said curl, pressing the outer edge portion of said closure member against said other die members to thereby bend said edge portion around said curl, into position to restrain said closure member from removal from said side wall member, simultaneously with the completion of the forming of said curl.

8. The method of manufacturing a container comprising
   (a) placing a substantially disk-shaped closure member having an annular recess in one face thereof and a corresponding annular ridge in the opposite face thereof in a die member with said ridge disposed in a complementary recess in said die member,
   (b) placing a substantially cylindrical-shaped tubular side wall member in position wherein one end thereof is disposed in said annular recess, and said side wall member is disposed between radially outwardly disposed dies,
   (c) moving said last mentioned dies radially inwardly into position to form a bead on said side wall member,
   (d) moving first mentioned die member and closure member toward said other die members and said side wall member in such a manner as to
      (1) form an outwardly projecting curl on said end within said annular recess, and
      (2) simultaneously with the latter stages of said forming of said curl, move the outer edge portion of said closure member into engagement with said other die members in such a manner that said outer edge portion is bent inwardly around said curl into operative engagement therewith effective to secure said closure member on said end.

9. The method of manufacturing a container comprising
   (a) placing a substantially disk-shaped, sheet metal closure member, having an outer edge portion formed to afford an annular recess in one face thereof and a substantially axially-aligned annular ridge on another face thereof, in a die with said ridge disposed in another recess in said die,
   (b) placing a substantially cylindrical-shaped, tubular sheet metal member, having an outwardly projecting curl on one end thereof, in position wherein
      (1) said curl is disposed in said annular recess in engagement with said one face, and
      (2) said side wall member is disposed between radially outwardly disposed jaws,
   (c) moving said jaws radially inwardly relative to said side wall member to thereby form an annular bead therein, and
   (d) moving said die toward said jaws and side wall member in a direction effective to
      (1) cause said curl to slide along said one face within said annular recess and bend said end into a box curl embodying said first mentioned curl as a part thereof, and
      (2) cause the outer edge of said outer edge portion to engage said jaws and be bent thereby around said box curl into engagement with said first mentioned curl for securing said closure member on said end.

References Cited

UNITED STATES PATENTS 2,394,019   2/1946   Socke _____ 113—120

FOREIGN PATENTS 410,188   5/1934   Great Britain.

CHARLES W. LANHAM, *Primary Examiner.*

R. D. GREFE, *Assistant Examiner.*